(12) United States Patent
LaPedis et al.

(10) Patent No.: US 7,890,723 B2
(45) Date of Patent: *Feb. 15, 2011

(54) METHOD FOR CODE EXECUTION

(75) Inventors: Ron LaPedis, San Bruno, CA (US); Arrigo Triulzi, Meyrin (CH)

(73) Assignee: SanDisk Corporation, Milpitas, CA (US)

( * ) Notice: Subject to any disclaimer, the term of this patent is extended or adjusted under 35 U.S.C. 154(b) by 738 days.

This patent is subject to a terminal disclaimer.

(21) Appl. No.: 11/618,519

(22) Filed: Dec. 29, 2006

(65) Prior Publication Data

US 2008/0162785 A1   Jul. 3, 2008

(51) Int. Cl.
*G06F 12/00* (2006.01)
(52) U.S. Cl. .................. 711/163; 711/103; 718/1; 719/319; 726/30; 235/382
(58) Field of Classification Search ............. 711/103, 711/163; 718/1
See application file for complete search history.

(56) References Cited

U.S. PATENT DOCUMENTS

| | | | |
|---|---|---|---|
| 5,570,315 A | 10/1996 | Tanaka et al. | |
| 5,774,397 A | 6/1998 | Endoh et al. | |
| 5,915,167 A | 6/1999 | Leedy | |
| 6,046,935 A | 4/2000 | Takeuchi et al. | |
| 6,373,746 B1 | 4/2002 | Takeuchi et al. | |
| 6,456,528 B1 | 9/2002 | Chen | |
| 6,522,580 B2 | 2/2003 | Chen et al. | |
| 6,771,536 B2 | 8/2004 | Li et al. | |
| 6,781,877 B2 | 8/2004 | Cernea et al. | |
| 6,845,908 B2 * | 1/2005 | Morita et al. | ............ 235/382 |
| 7,032,053 B2 | 4/2006 | Himmel et al. | |
| 7,277,998 B1 * | 10/2007 | Agesen et al. | ............ 711/163 |
| 2003/0147278 A1 | 8/2003 | Tanaka et al. | |
| 2005/0114387 A1 | 5/2005 | Evans et al. | |
| 2005/0193188 A1 | 9/2005 | Huang | |
| 2005/0278531 A1 | 12/2005 | England et al. | |
| 2006/0026338 A1 * | 2/2006 | Ebara et al. | ............ 711/103 |
| 2006/0070085 A1 * | 3/2006 | Bao et al. | ............ 719/319 |
| 2006/0080540 A1 | 4/2006 | Arnon et al. | |
| 2006/0168389 A1 | 7/2006 | Bentley | |
| 2006/0174100 A1 | 8/2006 | Park | |

(Continued)

FOREIGN PATENT DOCUMENTS

EP    1669858    6/2006

(Continued)

OTHER PUBLICATIONS

"VMware Virtual Infrastructure FAQ", http://www.vmware.com/pdf/vi_faq.pdf.

(Continued)

*Primary Examiner*—Yong Choe
(74) *Attorney, Agent, or Firm*—Jenkins, Wilson, Taylor & Hunt, P.A.

(57) ABSTRACT

Method for executing a software application is provided. The method includes detecting a host operating system; executing a virtual operating system in a virtual environment, wherein the virtual operating system is stored in a non-volatile memory device; and executing a software application in the virtual environment, wherein the software application is stored in the non-volatile memory device; and the virtual operating system and the software application are executed independently of the host operating system execution.

20 Claims, 5 Drawing Sheets

U.S. PATENT DOCUMENTS

| | | | |
|---|---|---|---|
| 2006/0179293 | A1 | 8/2006 | O'Connor et al. |
| 2006/0294105 | A1 | 12/2006 | Rosenan et al. |
| 2007/0180536 | A1* | 8/2007 | Kanai .................. 726/30 |
| 2008/0082976 | A1* | 4/2008 | Steinwagner et al. .......... 718/1 |
| 2008/0162775 | A1 | 7/2008 | LaPedis et al. |

FOREIGN PATENT DOCUMENTS

| | | |
|---|---|---|
| GB | 2 424 095 A | 9/2006 |
| WO | WO 03/079183 A2 | 9/2003 |

OTHER PUBLICATIONS

"VMWARE White Paper—Virtualization Overview", http://www.vmware.com/pdf/virtualization.pdf.

"What MOJOPAC does", *The Mercury News*, MercuryNews.com/9/23/2006, (Sep. 23, 2006).

Notification of Transmittal of the International Search Report and the Written Opinion of the International Searching Authority, or the Declaration for International Application No. PCT/US2007/088839 (Apr. 24, 2008).

"U3 Platform 1.0 SDK, Application Deployment Guide," Version 1.0, pp. 1-60 (Sep. 2005).

Non-Final Official Action for U.S. Appl. No. 11/618,526 (Oct. 1, 2009).

Final Official Action for U.S. Appl. No. 11/618,526 (May 24, 2010).

Interview Summary for U.S. Appl. No. 11/618,526 (Mar. 16, 2010).

* cited by examiner

METHOD FOR CODE EXECUTION

BACKGROUND OF THE INVENTION

1. Field of the Invention

The present invention relates to computing systems, and more particularly, to code execution.

2. Background

Computing systems (stand-alone and networked) are commonplace. The Internet has increased the popularity of electronic commerce, where users of computing systems conduct millions of electronic transactions. This increase in popularity has also made computing systems and user information vulnerable to pirates (sometimes known as "hackers").

Operating systems are computer programs used to perform certain computing tasks, such as, for example, managing input/output tasks, peripheral devices (for example, storage devices) and file systems. Operating systems provide a software platform on top of which other software applications are written. Software applications are used for various tasks, including, for example, word-processing, electronic mail (email) and Internet browsing. Some common operating systems include Windows®, Linux®, IBM® OS/2, MacOS, UNIX, and MS-DOS.

Many operating systems are pirated (or "hacked" i.e., they experience unauthorized use or interruption) through use of disruptive software programs, such as those known as computer viruses, worms, key-loggers, and root-kits. Securing operating systems and overall application code execution is a challenge.

Furthermore, software applications will often run on multiple operating systems or hardware platforms. Typically, separate code for a software application must be created for each different environment/platform. This is expensive and undesirable. An efficient method and system are desirable for managing code for software applications to be used on different hardware and software platforms.

SUMMARY OF EMBODIMENTS OF THE INVENTION

In one embodiment of the present invention, a method for executing a software application is provided. The method includes detecting a host operating system; executing a virtual operating system under a virtual engine, wherein the virtual operating system and the virtual engine are stored in a non-volatile memory device; and executing a software application in a virtual environment, wherein the software application is stored in the non-volatile memory device. The virtual operating system and the software application are executed independently of the host operating system execution.

In another embodiment of the present invention, a method for executing a software application is provided. The method includes authenticating a non-volatile memory device coupled to a host system; detecting a host operating system by the non-volatile memory device; executing a virtual operating system under a virtual engine, wherein the virtual operating system and the virtual engine are stored in a read only segment of the non-volatile memory device: and executing the software application in a virtual environment, wherein the software application is stored in a read-only segment of the non-volatile memory device. The virtual operating system and the software application are executed independently of the host operating system execution.

This brief summary is not intended to limit the invention to any particular embodiment. Rather, the invention is intended to cover the subject matter defined by the claims appended hereto, and all equivalents.

BRIEF DESCRIPTION OF THE DRAWINGS

The foregoing features and other features will now be described with reference to the drawings of a preferred embodiment. In the drawings, the same components have the same reference numerals. The illustrated embodiments are intended to illustrate, but not to limit the invention. The drawings include the following Figures.

DETAILED DESCRIPTION OF THE PREFERRED EMBODIMENTS

To facilitate an understanding of the preferred embodiment, the general architecture and operation of a computing system/non-volatile memory storage device will first be described. The specific architecture and operation of the preferred embodiment will then be described with reference to the general architecture.

Figure 1A:
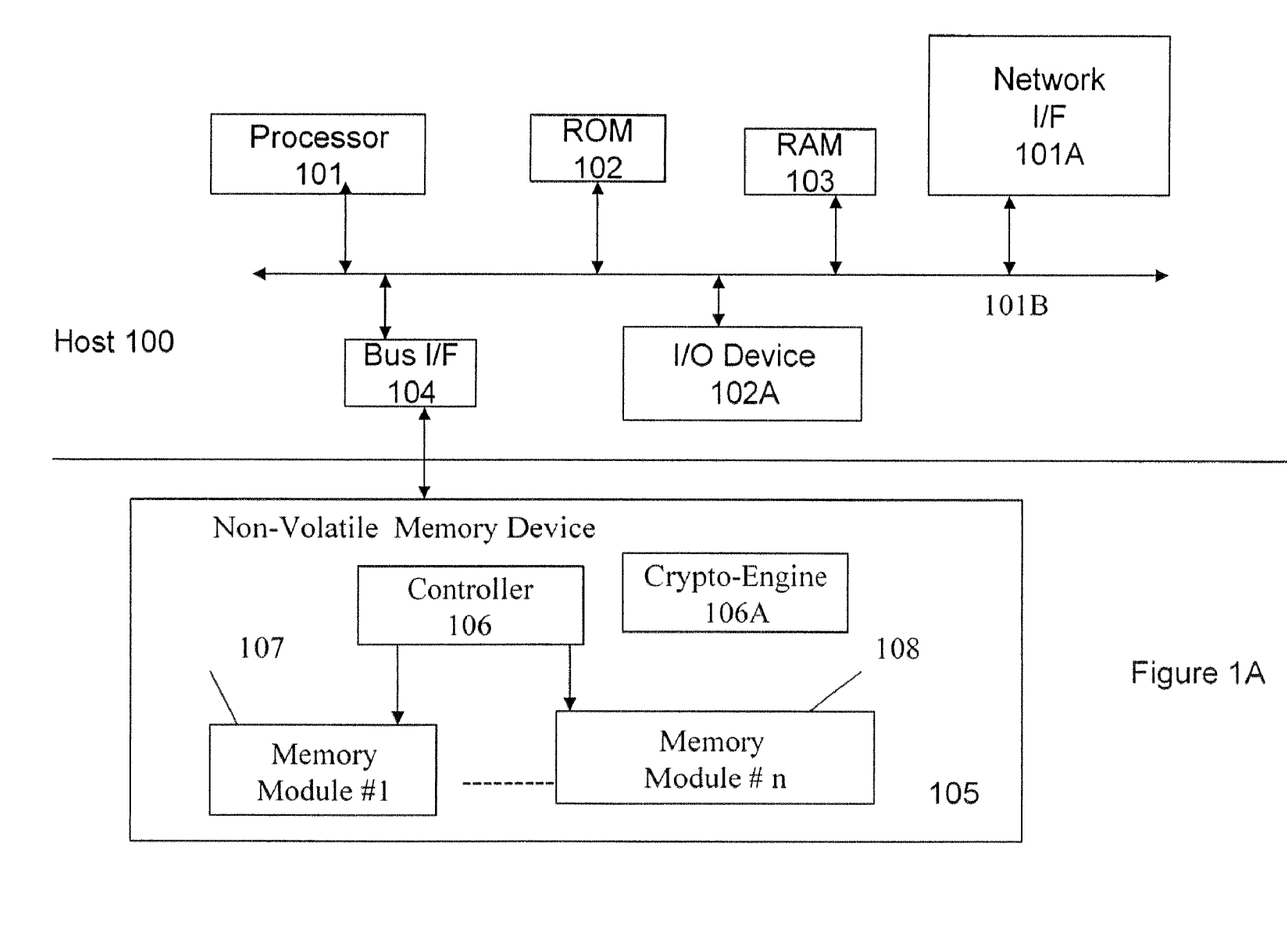
FIG. 1A shows a block diagram of a computing system of an embodiment.

FIG. 1A shows a block diagram of a typical computing system (may also be referred to as "host system" or "host") 100 that includes a central processing unit ("CPU") (may also be referred to as microprocessor/processor) 101 operationally coupled to a system bus 101B. Random access memory ("RAM") 103 provides CPU 101 with access to memory storage. When executing program instructions, CPU 101 stores those process steps (code) in RAM 103 and executes the stored process steps out of RAM 103.

Read only memory ("ROM") 102 is provided to store invariant instruction sequences such as start-up instruction sequences or Basic Input/Output Operating System (BIOS) sequences.

Input/Output ("I/O") devices 102A, such as, for example, a keyboard, a pointing device ("mouse"), a monitor, a modem and the like, are also provided for receiving input/output instructions.

Host system 100 optionally connects to a computer network (not shown) via network interface 101A. One such network is the Internet that allows host system 100 to download applications, code, documents and others electronic information.

Host system 100 is coupled to a non-volatile memory device (for example, a flash memory device (or card)) 105 that includes a controller module 106 (may also be referred to as "memory controller" or "controller"), and solid-state memory modules (may also be referred to as cells/cell arrays) 107-108 (shown as Memory Module #1 and Memory Module #n). Controller module 106 interfaces with host system 100 via a bus interface 104, directly via system bus 101B or any other peripheral bus (not shown).

Non-volatile memory device 105 includes a processor (shown as "crypto-engine") 106A that performs various cryptographic functions, for example, encrypting and/or decrypting stored content. Crypto-engine 106A may also be used to authenticate a non-volatile memory device, as described below.

In some embodiments, non-volatile memory devices are flash memory devices. There are currently many different flash memory cards that are commercially available, examples being the CompactFlash (CF), the MultiMediaCard (MMC), Secure Digital (SD), miniSD, Memory Stick, SmartMedia and TransFlash cards. Although each of these cards has a unique mechanical and/or electrical interface according to its standardized specifications (for example, the Universal Serial Bus (USB) specification based interface, incorporated herein by reference in its entirety), the flash memory included in each card is very similar. These cards are all available from SanDisk Corporation, assignee of the present application.

SanDisk Corporation also provides a line of flash drives under its Cruzer trademark, which are hand held memory systems in small packages that have a Universal Serial Bus (USB) plug for connecting with a host by plugging into the host's USB receptacle. Each of these memory cards and flash drives includes controllers that interface with the host and control operation of the flash memory on the card or drive.

Host systems that use such memory cards and flash drives are many and varied. They include personal computers (PCs), laptop and other portable computers, cellular telephones, personal digital assistants (PDAs), digital still cameras, digital movie cameras and portable audio players. Host systems typically include a built-in receptacle for one or more types of memory cards or flash drives but some require adapters into which a memory card is plugged.

A NAND architecture of the memory cell arrays 107-108 is currently preferred, although other architectures, such as NOR, can also be used instead. Examples of NAND flash memories and their operation as part of a memory system may be had by reference to U.S. Pat. Nos. 5,570,315; 5,774,397; 6,046,935; 6,373,746; 6,456,528; 6,522,580; 6,771,536 and 6,781,877 and United States Patent Application Publication number 2003/0147278.

The various embodiments described herein are not limited to the foregoing structures. Various other structures and memory types may be used, for example, non-flash memory devices can be used with this invention, such as one time programmable memory devices or 3D memory devices, which may include a monolithic three-dimensional memory array. In a three dimensional memory array, multiple memory levels are formed above a single substrate, such as a wafer, with no intervening substrates. The layers forming one memory level are deposited or grown directly over the layers of an existing level or levels. In contrast, stacked memories have been constructed by forming memory levels on separate substrates and adhering the memory levels atop each other, as in Leedy, U.S. Pat. No. 5,915,167, "Three dimensional structure memory." The substrates may be thinned or removed from the memory levels before bonding, but as the memory levels are initially formed over separate substrates, such memories are not true monolithic three dimensional memory arrays.

Figure 1B:
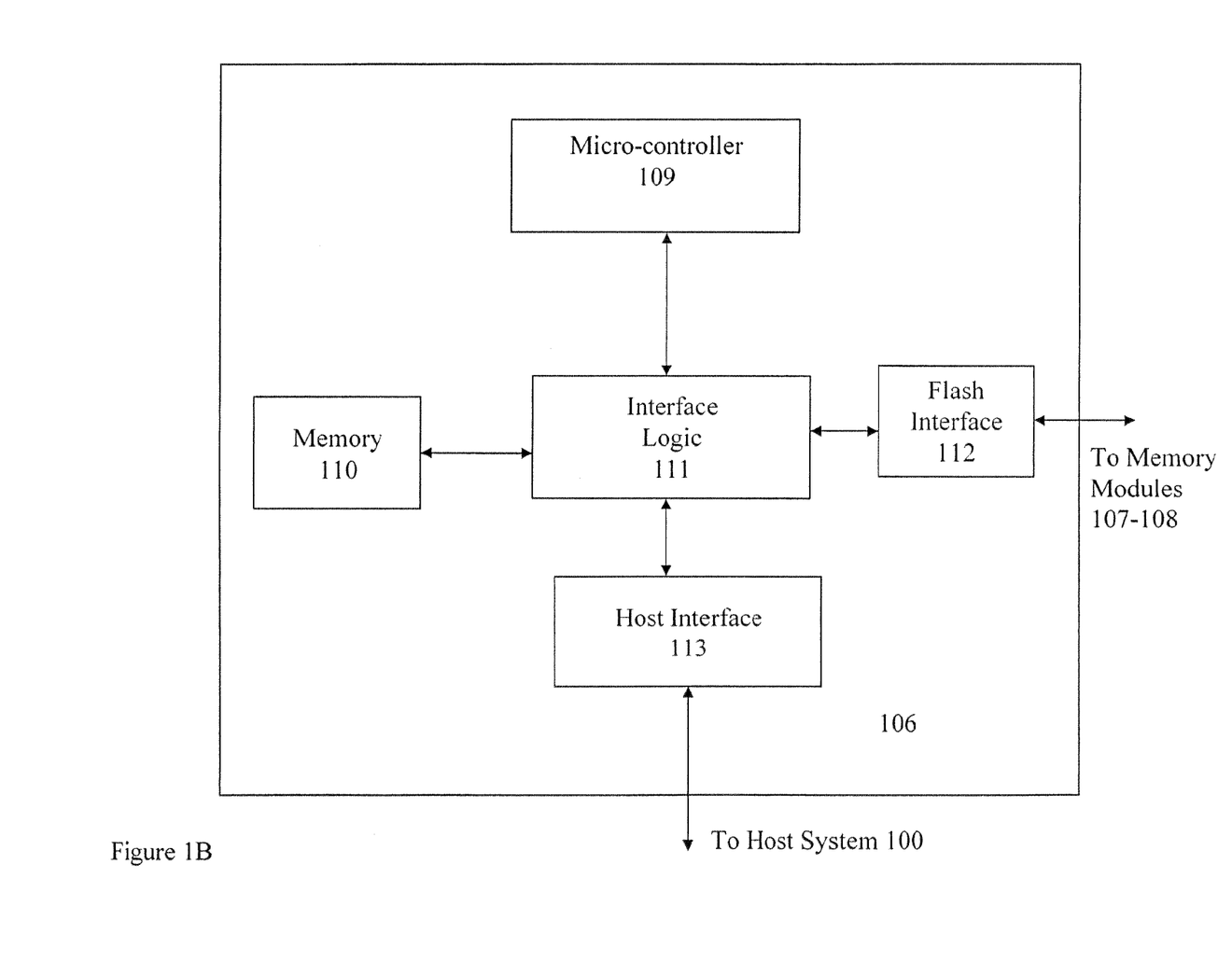
FIG. 1B shows a block diagram of a memory controller in FIG. 1A.

FIG. 1B shows a block diagram of the internal architecture of controller module 106. Controller module 106 includes a microcontroller 109 that interfaces with various other components via interface logic 111. Memory 110 stores firmware and/or software instructions that are used by microcontroller 109 to control the operation of non-volatile memory device 105. Memory 110 may be volatile re-programmable random access memory ("RAM"), a non-volatile memory that is not re-programmable ("ROM"), a one-time programmable memory or a re-programmable flash electrically-erasable and programmable read-only memory ("EEPROM").

A host interface 113 interfaces with host system 100, while a flash interface 112 interfaces with memory modules 107-108.

Figure 1C:
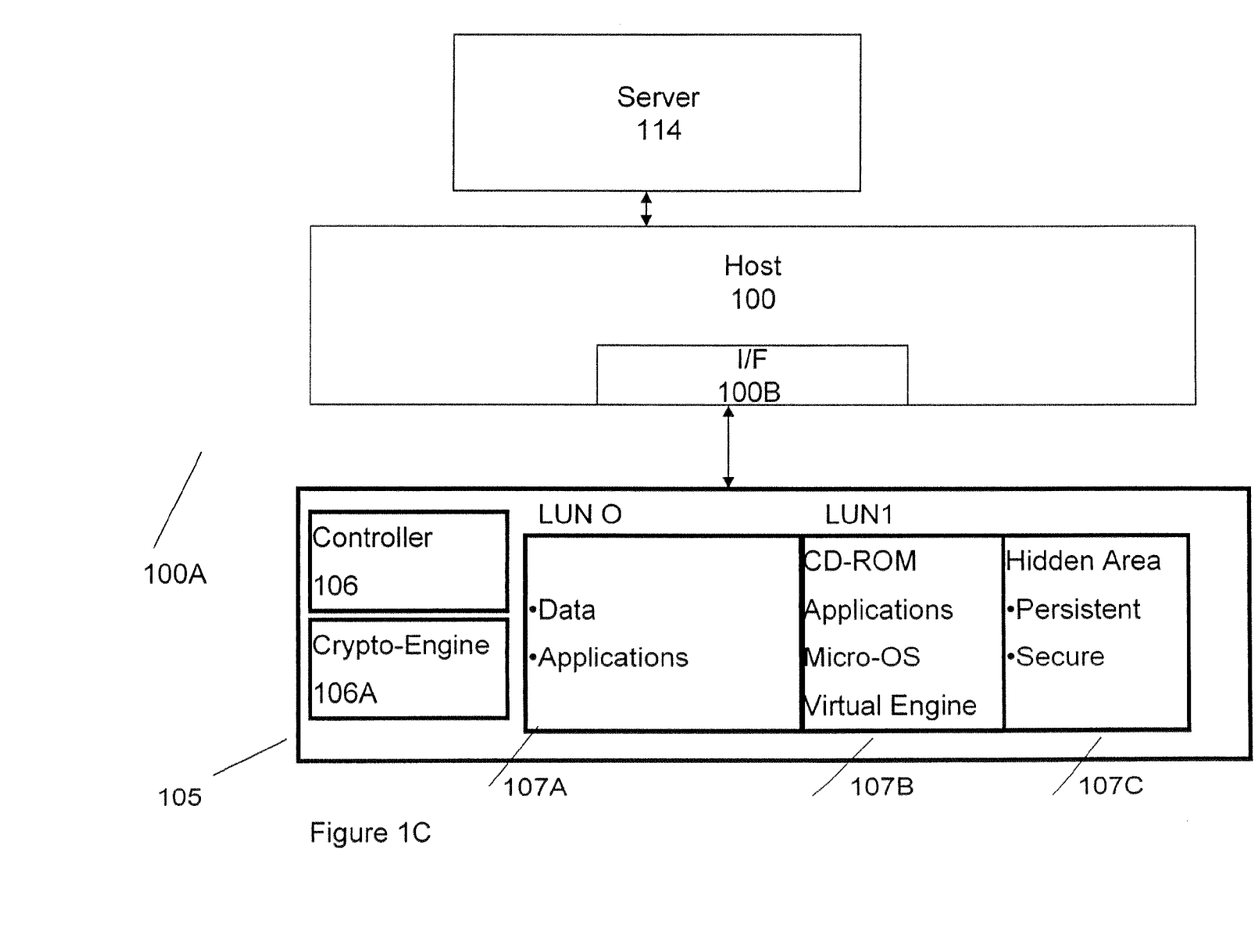
FIG. 1C shows a top-level block diagram of a system of an embodiment for authenticating a non-volatile memory device.

FIG. 1C shows a block diagram of system 100A where non-volatile memory device 105 interfaces with host system 100 via a USB interface 100B. A remote server 114 authenticates non-volatile memory device 105 before a user is allowed to use the non-volatile memory device.

Accordingly, in one embodiment, non-volatile memory device 105 conforms to the USB specification (i.e. can be accessed via a USB interface). Standard USB based application programming interface (API) may be used for reading or writing data.

Non-volatile memory device 105 appears to host 100 having a plurality of Logical Units (LUNs) of storage space and each LUN may appear to be of a different class of storage device. For example, non-volatile memory device 105 may appear to have both a standard Mass Storage Class volume (LUN 0, 107A), which imitates the behavior of a SCSI Hard Disk Drive, and a MMC Class volume, which imitates the behavior of a CD-ROM (LUN 1, 107B).

LUN 1 107B may store a plurality of software applications (116, FIG. 1D), a minimal version of all operating system ("Micro-OS") (115, FIG. 1D), code for a virtual engine (120, FIG. 1D), and other information, discussed below with respect to FIG. 1D.

Hidden area 107C is secured and is not available without proper authentication. Proprietary APIs may be used to access hidden area 107C. In one aspect, a protected (or secured) area means an area that is read-only and accessible only by an appropriate authenticated entity, for example, a host program, and the like. Hidden area 107C may store device certificates (118, FIG. 1D) and security keys (119, FIG. 1D) and other code, as described below with respect to FIG. 1D.

It is noteworthy that although host system 100 has been described above as having a CPU, ROM, RAM and other components, the adaptive aspects of the present invention may be implemented on a "thin" client, i.e., a host system that has limited computing abilities. For example, a USB reader/executor with a keyboard, mouse, video card, network card and CPU can execute whatever code/application is stored on non-volatile memory device 105, instead of a desktop or notebook computer.

Figure 1D:
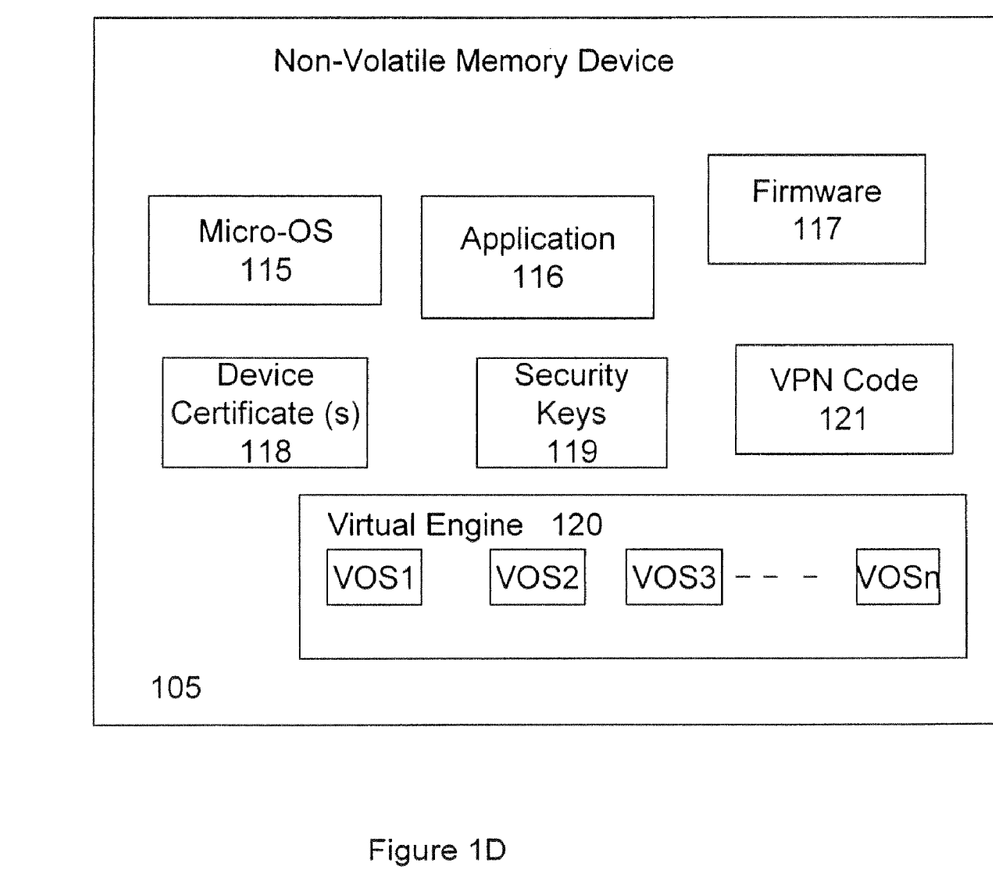
FIG. 1D shows a block diagram of a software architecture of an embodiment.

FIG. 1D shows a plurality of software components that may be stored in non-volatile memory device 105 and used according to one aspect of the present invention. Firmware 117 is used to control the overall operation of non-volatile memory device 105 and is executed by controller 106.

Micro-OS 115 is a minimal version of an operating system, i.e., it has reduced functionality compared to a standard operating system. Micro-OS 115 is used to control the overall environment in which code for a virtual engine is executed. Micro-OS 115 may be customized to rum code for the virtual engine, described below. Micro-OS may be stored in the read only segment 107B (FIG. 1C).

Application 116 may be a software application that a user may want to execute on different hardware/software platforms. More than one application 116 may be stored in non-volatile memory device 105.

Application 116 may include a web browser, for example, Firefox®, that a user uses to browse websites. The web browser may run on any computer connected to the Internet. The web browser receives and sends requests to a web server and acquires information from a World Wide Web (WWW), a network of computers. A web server is a program that, upon receipt of a request, sends requested data to a requesting user.

Virtual engine (or machine) (VE) 120 includes code for providing a virtual environment. The virtual environment provides a software platform that is independent of a host operating system. Code that is executed in the virtual environment is not controlled by the host operating system, but instead is controlled by a virtual operating system executed within the virtual environment.

VE 120 also includes executable code for different operating systems executed in the virtual environment, independent of the underlying host operating system. Micro-OS 115 controls the overall execution of VE 120.

Code blocks for different operating systems are shown as VOS1, VOS2, VOS3 and VOSn. VOS1 may be used to execute a Windows® based operating system, VOS2 may be used for a Linux operating system, VOS2 may be used for a UNIX based operating systems and so forth. The operating system specific code (VOS1-VOSn) is executed in a virtual environment, independent of the host system 100 operating system. VE 120 allows a user to use non-volatile memory device 105 on different hardware/software platforms.

Different types of virtual engines 120 may be used to implement the adaptive aspects of the present invention. For example, VMWare Player and VMWare Ace available from VMware Corporation; VirtualPC available from Microsoft Corporation; and others may be used. It is noteworthy that more than one virtual engine may be stored and used for application execution. This will make it more difficult for pirates to break into the operating system because the viruses or other disruptive software will have to hook to low-level support for two or more virtual engines instead of one virtual engine.

The non-volatile memory device 105 during an authentication stage, as described below uses device certificates 118.

Security keys 119 may be used to generate a one-time password to authenticate a user/device. Security keys 119 may be used by crypto-engine 106A to encrypt stored content, using standard or proprietary encryption techniques.

Virtual private network (VPN) code 121 is provided to facilitate a VPN connection, as described below. Access to VPN code 121 is limited (by storing in LUN 1 (107B), FIG. 1C) so that a virtual connection is difficult to pirate or break into.

It is noteworthy that executable code for a plurality of software components (Micro-OS 115, application 116, firmware 117, device certificates 118, security keys 119, virtual engine 120 and VPN code 122) may be stored in secured segment 107C or in read only segment 107B. Furthermore, executable code for the plurality of components may be bifurcated and partially stored in the read only segment 107B and secured segment 107C.

Figure 2:
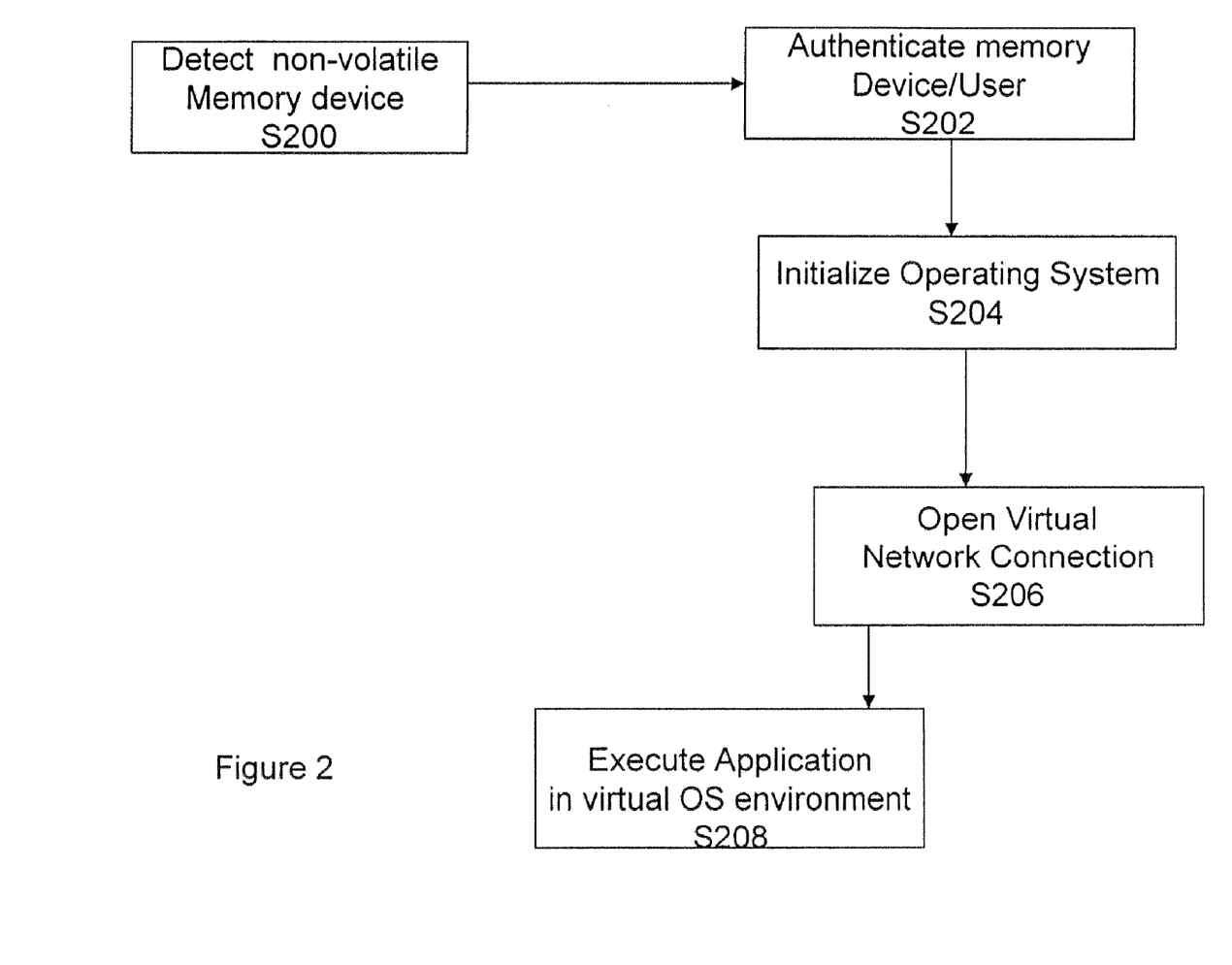
FIG. 2 shows a process flow diagram of an embodiment.

FIG. 2 shows a process flow diagram for securing operating system/application execution in one aspect of the present invention. The process starts in step S200, when non-volatile memory device 105 is coupled to host system 100 that detects non-volatile memory device 105. Most host systems today have a "Plug-N-Play" option where a device is detected as soon as it is plugged in. Firmware 117 or hardware (not shown) detects the type of operating system that is running on host system 100.

After the host operating system is detected, in step S202, non-volatile memory device 105 and a user using the device are authenticated. In one aspect, server 114 authenticates non-volatile memory device 105 using device certificates 118. A standard or proprietary technique may be used to authenticate non-volatile memory device 105. For example, a public key infrastructure (PKI) certificate (for example, 118) may be used to authenticate non-volatile memory device 105. A user using non-volatile memory device 105 may also have to authenticate itself before being allowed access to non-volatile memory device 105. This may be performed by using a unique, user-specific password, generated by using security keys 119. Crypto-engine 106A may be used to authenticate non-volatile memory device 105 and the user. Step S202 attempts to prevent unauthorized use of non-volatile memory device 105.

In step S204, non-volatile memory device 105 loads code (VOS1, VOS2, VOS3, or VOSn) for a virtual machine into RAM 103. In one aspect of the present invention, controller 106 may execute virtual engine code 120 to initialize a virtual environment. In another aspect, virtual engine code 120 execution may be split such that one code segment is executed by the host CPU (101, FIG. 1A) and another segment is executed by non-volatile memory device 105. This makes pirating or hacking difficult.

After virtual engine code 120 is initialized, all other applications/code (for example, application 116) is executed in a virtual environment independent of the host operating system.

In step S206, host system 100 opens a virtual private network (VPN) connection (not shown) to an enterprise server or gateway (not shown). The nature of the network connection will depend on the connection, e.g., whether the connection is to a web server or local area network. VPN code 121 may be used to open the VPN connection.

In step S208, application 116 is executed in the appropriate virtual operating system environment. Application 116 is executed in a virtual environment controlled by virtual engine 120, independent of the host operating system. Hence, it is difficult to break into (hack into) application 116 execution.

In one aspect of the present invention, code for application 116 is written so that it may be executed in a virtual environment which may be independent of a host system operating system. Hence, different versions for application 116 for different operating systems and platforms are not needed. This reduces overall cost of code development/maintenance.

In another aspect of the present invention, because virtual engine 120 and application 116 are stored in a read only segment (for example, 107B (or 107C)) of non-volatile memory device 105, they are difficult to pirate.

In yet another aspect of the present invention, a secure environment is provided to a user to conduct electronic commerce transactions, for example, bank transactions, without changing overall user experience. Once non-volatile memory device 105 is connected and the virtual environment is launched, the user simply navigates to a website with minimal pirating risk.

While the present invention is described above with respect to what is currently considered its preferred embodiments, it is to be understood that the invention is not limited to that described above. To the contrary, the invention is intended to cover various modifications and equivalent arrangements within the spirit and scope of the appended claims.

What is claimed is:

1. A method for executing a software application, comprising:

authenticating a non-volatile memory device coupled to a host system;

detecting a host operating system, wherein the non-volatile memory device detects the host operating system;

executing a virtual operating system in a virtual environment, wherein the virtual operating system is stored in a read only segment of the non-volatile memory device; and executing the software application in the virtual operating system while the virtual operating system executes in the virtual environment, wherein the software application is stored in a read-only segment of the non-volatile memory device; wherein the virtual environment is controlled by a virtual engine rather than by the host operating system and wherein execution of the virtual engine code is split such that a first portion of the virtual engine code is executed by the host system and a second portion of the virtual engine code is executed by the non-volatile memory device.

2. The method of claim 1, wherein the software application is a web-browser.

3. The method of claim 1, wherein a remote server authenticates the non-volatile memory device using a device certificate stored in a secure area of the nonvolatile memory device.

4. The method of claim 1, wherein the virtual operating system and the software application are executed within the virtual environment controlled by the virtual engine executing on a host system processor after the first portion of the virtual engine code, the virtual operating system, and the software application are loaded by the non-volatile memory device to a host system memory.

5. The method of claim 1, wherein the virtual operating system and the software application are executed within the virtual environment controlled by the second portion of the virtual engine code executing on a non-volatile memory device controller.

6. The method of claim 1, wherein the non-volatile memory device is a universal serial bus (USB) device that interfaces with the host system via a USB interface.

7. The method of claim 1, wherein the virtual operating system and the software application are stored in a secured area of the non-volatile memory device.

8. The method of claim 1, wherein the host system opens a virtual network connection based on code stored in the non-volatile memory device.

9. The method of claim 1, wherein the software application can be executed in more than one hardware and software environment.

10. The method of claim 1, wherein the virtual engine code is stored in a read only segment of the non-volatile memory device.

11. A method for executing a software application, comprising:

detecting a host operating system;

executing a virtual operating system in a virtual environment, wherein the virtual operating system is stored in a non-volatile memory device; and executing a software application in the virtual operating system while the virtual operating system executes in the virtual environment, wherein the software application is stored in the non-volatile memory device; wherein the virtual environment is controlled by a virtual engine rather than by the host operating system and wherein execution of the virtual engine code is split such that a first portion of the virtual engine code is executed by the host and a second portion of the virtual engine code is executed by the non-volatile memory device.

12. The method of claim 11, wherein the software application is a web-browser.

13. The method of claim 11, wherein a remote server authenticates the non-volatile memory device using a device certificate stored in the non-volatile memory device.

14. The method of claim 11, wherein the virtual operating system and the software application are stored in a read-only segment of the non-volatile memory device; and the virtual operating system and the software application are executed within the virtual environment controlled by the first portion of the virtual engine code executing on a host system processor after the virtual engine, the virtual operating system, and the software application are loaded by the non-volatile memory device to a host system memory.

15. The method of claim 11, wherein the virtual operating system and the software application are stored in a read-only segment of the non-volatile memory device; and the virtual operating system and the software application are executed within the virtual environment controlled by the second portion of the virtual engine code executing on a non-volatile memory device controller.

16. The method of claim 11, wherein the non-volatile memory device is a universal serial bus (USB) device that interfaces with the host system via a USB interface.

17. The method of claim 11, wherein the virtual operating system and the software application are stored in a secured area of the non-volatile memory device.

18. The method of claim 11, wherein the host system opens a virtual network connection based on code stored in the non-volatile memory device.

19. The method of claim 11, wherein the software application can be executed in more than one hardware and software environment.

20. The method of claim 11, wherein code for the virtual engine is stored in a read only segment of the nonvolatile memory device.

* * * * *